United States Patent
Aaron et al.

(10) Patent No.: US 10,489,819 B2
(45) Date of Patent: *Nov. 26, 2019

(54) METHODS, SYSTEMS, AND PRODUCTS FOR IDENTIFYING FRAUDULENT ACTIVATIONS OF ADVERTISEMENTS

(71) Applicant: AT&T Intellectual Property I, L.P., Atlanta, GA (US)

(72) Inventors: Jeffrey A. Aaron, Atlanta, GA (US); John Ruckart, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 515 days.

This patent is subject to a terminal disclaimer.

(21) Appl. No.: 14/174,031

(22) Filed: Feb. 6, 2014

(65) Prior Publication Data

US 2014/0156390 A1    Jun. 5, 2014

Related U.S. Application Data

(63) Continuation of application No. 11/675,124, filed on Feb. 15, 2007, now Pat. No. 8,676,637.

(51) Int. Cl.
*G06Q 30/02* (2012.01)
*H04M 15/00* (2006.01)
*H04W 4/24* (2018.01)

(52) U.S. Cl.
CPC ......... *G06Q 30/0248* (2013.01); *G06Q 30/02* (2013.01); *G06Q 30/0272* (2013.01); *G06Q 30/0277* (2013.01); *H04M 15/47* (2013.01); *H04M 15/8033* (2013.01); *H04W 4/24* (2013.01); *H04M 2215/0148* (2013.01); *H04M 2215/2026* (2013.01); *H04M 2215/7435* (2013.01)

(58) Field of Classification Search
USPC ............................ 709/224; 705/51; 340/988
See application file for complete search history.

(56) References Cited

U.S. PATENT DOCUMENTS

| | | | |
|---|---|---|---|
| 6,331,825 B1 * | 12/2001 | Ladner | B60R 25/102 340/988 |
| 7,584,287 B2 | 9/2009 | Schneider et al. | |
| 7,657,626 B1 * | 2/2010 | Zwicky | G06Q 30/02 705/51 |
| 7,685,279 B2 | 3/2010 | Miltonberger et al. | |
| 2001/0037314 A1 | 11/2001 | Ishikawa | |
| 2007/0255821 A1 * | 11/2007 | Ge | G06Q 10/00 709/224 |

OTHER PUBLICATIONS

"Real Time Click Fraud Detection at Your Fingertips," ClickFraud-Detective, 2 pages, accessed Oct. 22, 2006.
Feldblum, Eli, "Click Fraud: How to Detect and Stop a Growing Problem," PPCA, 3 pages, accessedl/Jan. 5, 2007.

(Continued)

*Primary Examiner* — Saba Dagnew
(74) *Attorney, Agent, or Firm* — Scott P. Zimmerman, PLLC (57) ABSTRACT

Potential click fraud is determined. When a client device activates an Internet advertisement, the location of the client device is determined. Multiple activations of the same advertisement, by the client device, may indicate fraud.

20 Claims, 8 Drawing Sheets

(56) References Cited

OTHER PUBLICATIONS

Chapell, Alan, "Re-Evaluating Click Fraud," iMedia Connection, 5 pages, accessed Oct. 23, 2006.
"Internet Traffic Audit," Authenticlick: Professional Click Fraud Audit and Recovery Service, 1 page, accessed Oct. 23, 2006.
"Click Fraud and How to Fight It" webpronews.com, 10 pages, accessed Oct. 23, 2006.

* cited by examiner

METHODS, SYSTEMS, AND PRODUCTS FOR IDENTIFYING FRAUDULENT ACTIVATIONS OF ADVERTISEMENTS

CROSS-REFERENCE TO RELATED APPLICATION

This application is a continuation of U.S. application Ser. No. 11/675,124 filed Feb. 15, 2007, now issued as U.S. Pat. No. 8,676,637, and incorporated herein by reference in its entirety.

FIELD OF THE INVENTION

The present invention relates to Internet advertising and, more particularly, to methods, systems and computer program products that may be used to identify the fraudulent activation of Internet advertisements.

BACKGROUND OF THE INVENTION

The Internet is populated with a large number of web sites that may be accessed by individuals (herein "users") that browse the Internet. A "web site" may include one or more related web pages which may be delivered to the user's computer (or other device) for viewing by the user. Many web sites have a "main" or "home" web page that is typically the first page that is displayed to a user when the user accesses the web site. The user may then directly or indirectly request, receive and display the remaining (secondary) web pages associated with the web site from the main web page.

Figure 1:
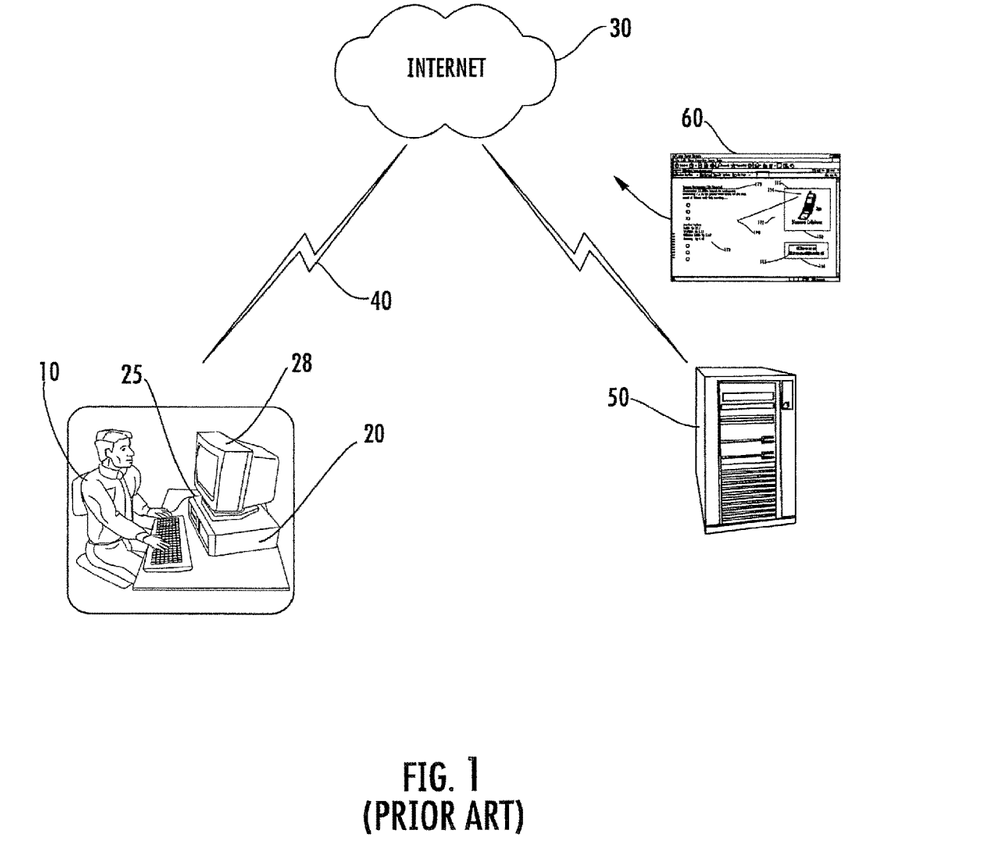
FIG. 1 is schematic diagram illustrating conventional methods by which a user can access and view web pages via the Internet.

As shown in FIG. 1, a user 10 may access the Internet 30 using, for example, a computer 20 that is connected to the Internet 30 via a modem, local area network, wireless, satellite or other connection 40. Typically, the user 10 accesses the Internet 30 by activating a web browser software program 25 that is resident on the computer 20 such as, for example, Microsoft's Internet Explorer™ or Netscape Navigator™. The web browser program 25 sends a request over the modem or local area network connection 40 to a server 50 that is connected to the Internet 30. Typically, the user's computer 20 is set to initially contact the same server 50 each time the web browser 25 is opened to access the Internet 30. In response to the request from the web browser 25, the contacted server 50 may deliver a web page 60 to the user's computer 20 via the modem or local area network connection 40, which is then displayed on a monitor 28 of the computer 20. From this initially delivered web page 60, the user 10 may navigate to any of a host of other web pages by, for example, typing in the address associated with a desired web page or by activating a "hyperlink" (discussed below) that automatically delivers a web page associated with the hyperlink to the user's computer 20. The owners/operators of servers that deliver web pages over the Internet are referred to herein as "content providers."

Many content providers attempt to include an array of interesting subject matter on their main web pages in an effort to attract substantial traffic to their web sites. These content providers also typically allocate space on their main web page and/or on secondary web pages for Internet advertisements. Herein, the term "Internet advertisement" is used to refer to any content that is included on an Internet web page or otherwise displayed on monitors (or other displays) of users viewing an Internet web page in return for some sort of compensation. Thus, the term "Internet advertisement" encompasses, for example, traditional Internet advertisements such as banner and pop-up advertisements, as well as less traditional forms of advertising such as paying to have information regarding your business placed in a favorable location in the listing of results for a search conducted by an Internet search engine. The compensation may comprise monetary payment(s) or may be something else of value such as payment in the form of goods, services, hosting reciprocal advertisements, etc. Internet advertising is growing in importance as an advertising medium for many businesses. As such, Internet advertising has become an increasingly lucrative source of revenues for many Internet companies such as Internet portals and search engine companies.

Internet advertisements come in a variety of forms, and may include text, icons, graphics, pictures, video clips, etc., some or all of which may promote products or services associated with the entity sponsoring the advertisement. In some instances, the Internet advertisement may simply be information that is displayed on a portion of a web-page (which is often referred to as a "banner" advertisement). Another common form of Internet advertisement is a "pop-up" advertisement, which refers to an advertisement that overlays a portion of a web-page (and which often is configured to "pop-up" over the web page content while the user 10 is viewing the web page 60. In many cases, an Internet advertisement can be "activated" in the sense that a user may select the advertisement such that another web page or other information is delivered to the user's computer. Most typically, an Internet advertisement is activated by activating a "hyperlink" that is embedded in the Internet advertisement. A hyperlink refers to a word, phrase, icon, picture or other object or region on the user's display that the user 10 (i.e., the viewer of the web page) can activate to link directly to a different web page that is associated with the hyperlink. When the hyperlink is activated, a request is sent to a server that hosts the web page associated with the hyperlink (the "target web page") and, in response to this request, the server delivers the target web page to the user's computer where it is displayed to the user (either replacing the currently viewed web page or displaying the target web page in a separate window). In the Internet advertising context, the target web page will typically provide additional details regarding the entity, product or service that is the subject of the advertisement and/or may provide the user a mechanism by which the user can purchase the product or service over the Internet.

One common method that content providers may use to charge for "hosting" or "posting" Internet advertisements on their respective web pages is to bill the businesses whose advertisements are displayed based on the number of times that viewers activate hyperlinks that are embedded in the posted advertisements. The most common method for a user 10 to activate a hyperlink is to move a pointing device such as a computer mouse so that the cursor is positioned over top of the hyperlink, and to then click on a button on the mouse with the cursor in that position to activate the hyperlink. Accordingly, the above-described method of paying for Internet advertisements based on the number of times users "click" on the advertisement is often referred to as a "pay-per-click" method. The pay-per-click payment method is, in effect, a way that an entity sponsoring an Internet advertisement can pay the content provider that posts the advertisement for each actual referral. This manner of payment has grown in popularity as it allows the payment for the Internet advertisement to reflect how effective the advertisement was in directing viewers (users) to seek out additional information regarding the advertised product or service. In many instances, companies may pay the content providers that post Internet advertisements a substantial sum per click (e.g., $0.50 or more per click), which may generate substantial advertising revenues.

Unfortunately, the pay-per-click method of payment for Internet advertising may be subject to fraud and abuse. For example, a competitor of a company that sponsors a pay-per-click advertisement on an Internet web page may have its employees repeatedly click on the advertisement in an effort to drive up its competitor's advertising expenses. Businesses which host Internet advertisements may also have perverse incentives to click on those advertisements in order to generate Internet advertising revenues. In fact, news sources have reported apparent instances where individuals have been hired, often in third world countries where unskilled labor is less expensive, to click on certain Internet advertisements for purposes of generating increased pay-per-click advertising revenues and/or for driving up a competitor's advertising costs. Similar instances have been reported where computer programs that repeatedly click on an Internet advertisement automatically have been used for the same purposes. The potential for these and other types of "click fraud" degrade from the desirability of pay-per-click Internet advertising.

SUMMARY

Methods, systems and computer programs for identifying a potentially fraudulent activations of an Internet advertisement (i.e., "click fraud") are provided. The Internet advertisement may, for example, be a banner or pop-up advertisement that is displayed on a web page, and the advertisement may be "activated" by a mouse click on a hyperlink that is embedded within the advertisement. In some embodiments of the present invention, methods of identifying a potentially fraudulent activations of an Internet advertisement are provided in which information relating to each activation of the advertisement is collected. The collected information includes a measured location of the sources that activated the advertisement. One or more of the sources of the activations may be identified as potentially fraudulent source(s) based, at least in part, on the respective measured locations of such sources. In these methods, the measured location may be received, for example, from a location-capable device that is associated with each source that activated the advertisement.

The collected information may include a time at which each activation occurred, and one of the sources may be identified as a potentially fraudulent source if it is determined that the Internet advertisement was activated from the measured location of that source more than a threshold number of times within a given time period. In some cases, demographic information associated with the measured location of one or more of the sources that activated the Internet advertisement may be used in identifying the potentially fraudulent source(s). The threshold that is applied for a particular source may be set, for example, based at least in part on this associated demographic information.

Pursuant to other embodiments of the present invention, methods of detecting click fraud are provided in which information relating to a click on an Internet advertisement is received, along with a measured location of the source of the click. The source may be identified as potentially fraudulent based at least in part on the received information and the measured location of the source. By way of example, in some of these methods, the source may be identified as potentially fraudulent based on a determination that the Internet advertisement was activated from the measured location of the source more than a first threshold number of times within a first time period.

The received information may include a time at which the click on the Internet advertisement occurred. In addition, in some embodiments, a click-through-rate (i.e., the percentage of times that the advertisement was displayed that resulted in the user clicking on or otherwise activating the advertisement) for the geographic region in which the source is located may be tracked, and the source may be identified as potentially fraudulent if the click-through-rate for the geographic region exceeds an expected value. This expected value may be determined, in some cases, based on the click-through-rate of a second geographic region. In these and other embodiments, demographic information associated with the measured location of the source may also be used to assist in identifying potentially fraudulent sources.

Pursuant to still further embodiments of the present invention, methods of detecting click fraud are provided in which a respective location for at least some of a plurality of sources of clicks on an Internet advertisement are recorded or otherwise tracked. Each respective location is then associated with a geographic region in which the location falls. A click-through-rate is then tracked for at least some of these geographic regions. Finally, fraudulent clicks on the Internet advertisement are identified based at least in part on the tracked click-through-rates. The expected click-through-rate for each region may be determined, in some embodiments, based upon demographic information associated with each respective region and may also be based on the click-through-rates for other regions.

While embodiments of the invention has been described above primarily with respect to methods, it will be appreciated that the invention also includes related systems and computer program products that may be used to carry out these methods. In addition, other systems, methods and/or computer program products according to embodiments will be or become apparent to one with skill in the art upon review of the following drawings and detailed description. It is intended that all such additional systems, methods and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

Methods, systems and computer program products for identifying and tracking potentially fraudulent activations of Internet advertisements (i.e., "click fraud") are provided that use measured location data. Herein, a "fraudulent" activation of an Internet advertisement refers to an activation that was performed at least in part for purposes of causing the entity sponsoring the advertisement to be assessed a referral (pay-per-click) fee. In many cases, it may be difficult to determine with absolute certainty whether a particular activation of an Internet website was indeed a fraudulent activation. Accordingly, certain of the methods, systems and computer products according to embodiments of the present invention may be designed to identify "potentially" fraudulent activations, which refer to activations that are deemed likely to be fraudulent activations based on an analysis of certain data, including data relating to the activation of the Internet advertisement.

Pursuant to certain embodiments of the present invention, when a user requests a web page over the Internet, the request (or a subsequent communication from the user) may include measured location data that provides the user's location. The measured location data may be obtained from a location-capable device that is associated with the user such as, for example, a cellular telephone that includes a Global Positioning Satellite ("GPS") receiver. Herein, the phrase "measured location" is used to refer to a location that is physically calculated or otherwise determined. A data processing system may track information such as the time of day, the day of the week, the source IP address, etc. of each activation of one or more Internet advertisements, and may detect possible instances of click fraud via analysis of the tracked information and the provided measured location data. For example, a determination that one or more sources at a particular measured location has activated an Internet advertisement more than a threshold number of times in a certain time period may be an indication that click fraud is occurring. In certain embodiments of the present invention, the analysis may also consider demographic information associated with the measured location of each source activating the Internet advertisement. Moreover, in some embodiments of the present invention the presence or absence of measured location data may effect the amount the entity sponsoring the advertisement pays the content provider for hosting the Internet advertisement.

Figure 2:
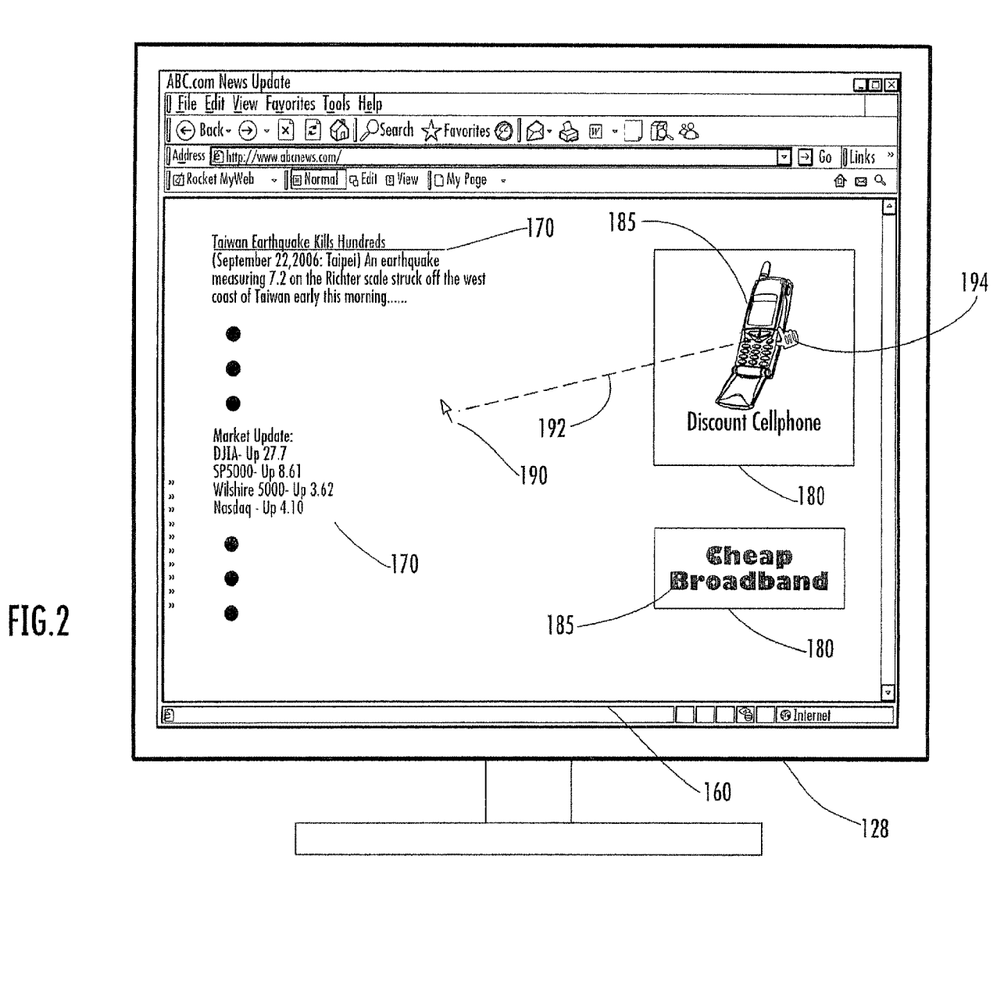
FIG. 2 is schematic diagram depicting an Internet web page that includes an Internet advertisement.

FIG. 2 is schematic diagram depicting an example of an Internet web page 160 as it appears on the monitor 128 of the user's computer 120. As shown in FIG. 2, the Internet web page 160 may include various content 170 (here news stories and stock market summaries) along with hyperlinks (indicated by underlining in FIG. 2). The hyperlinks may be used to retrieve additional web pages that contain further news stories and/or related information content. As is also shown in FIG. 2, the web page 160 may also include one or more Internet advertisements 180. Each Internet advertisement 180 may comprise, for example, text messages, pictures, diagrams, tables, graphs, schematics, drawings, animations, video clips, pop-ups, etc. and/or combinations thereof that appear on a web page when the web page is being viewed by a user 110. Moreover, in many cases, a hyperlink 185 or some other mechanism is provided within the Internet advertisement 180 which allows an interested user 110 to obtain access to additional information regarding the product, service, company, etc. that is the subject matter of the Internet advertisement 180. As discussed above, the user 110 viewing the web page 160 that contains the Internet advertisement 180 can activate the hyperlink 185 by, for example, moving a pointing device such as the cursor 190 on a computer mouse so that it is positioned on the Internet advertisement 180 or on a hyperlink 185 within the Internet advertisement 180, and then activating the pointing device. This activation process is illustrated in FIG. 2 by the dotted line 192 that illustrates movement of the cursor 190 associated with a computer mouse from a position in the middle of the web page 160 to a position on top of an Internet advertisement 180 that is included on the web page 160. As shown in FIG. 2, when the cursor 190 reaches a position from which a particular hyperlink 185 may be activated, the cursor 190 may change shape to a configuration 194 that indicates that the cursor is on top of a hyperlink 185. By clicking on the mouse (or other pointing device) when the cursor 190 overlies the hyperlink 185, the user 110 may activate the hyperlink 185 and thereby call-up another web page 160' that is associated with the Internet advertisement 180. While the above discussions illustrate one way in which a user 110 can activate an Internet advertisement 180, it will be appreciated that numerous other methods exist and that the embodiments of the present invention described herein are not limited to any particular method of activating an Internet advertisement 180. By way of example, in some embodiments, positioning the cursor 190 of a mouse over a hyperlink 185 embedded within an Internet advertisement 180 may be sufficient to activate the hyperlink 185 (i.e., a click is not necessary). As another example, keystrokes may be used instead of a mouse to activate the hyperlink 185. As activating a hyperlink 185 is the most common method of activating an Internet advertisement 180, it will be appreciated that herein references to activating a hyperlink 185 that is within and/or associated with an Internet advertisement 180 indicate that the Internet advertisement 180 has been activated.

As discussed above, one common method by which a content provider that hosts Internet advertisements 180 may charge for hosting such advertisements 180 is by charging a predetermined amount each time a user 110 activates a hyperlink 185 associated with the Internet advertisement 180. However, as is also discussed above, this method of charging may provide incentives for the content provider hosting the Internet advertisement 180 and/or for competitors of the entity sponsoring the Internet advertisement 180 to engage in "click fraud" to respectively, increase their own compensation or increase the operating costs of their competitor. Such click fraud may involve, for example, having individuals repeatedly visit the web page 160 that hosts the Internet advertisement 180 at issue and then activate one or more hyperlinks 185 embedded within the Internet advertisement 180. In some instances, individuals have been paid to repeatedly activate certain Internet advertisements 180. Another type of click fraud is the use of automated software programs that automatically repeatedly activate a particular Internet advertisement 180.

Fortunately, information is often available that may help identify when instances of click fraud are occurring. For example, the time at which a hyperlink 185 is activated may be indicative as to whether the activation was a legitimate inquiry or the result of click fraud. For instance, activations that occur in the middle of the night may be much more suspect than activations that occur during regular business hours or in the early evening. The number of activations per day of the week may also be suggestive as to whether or not click fraud is occurring, particularly for advertisements that are less likely to be viewed on certain days of the week. The Internet Protocol ("IP") address associated with the source of the click and/or the IP block owner may also be considered in evaluating if click fraud is occurring. With respect to pay-per-click Internet advertisements that comprise favorable placement of a particular search result, the keyword(s) used in the search that resulted in the Internet advertisement 180 being displayed may also be considered in identifying instances of click fraud. Thus, through analysis of the above (and/or other) information it may be possible to identify potentially fraudulent clicks and the sources of such fraudulent clicks. Corrective action may then be taken, for example, in the form of refunds of all or part of the fee charged for such fraudulent clicks, and/or in the form of blacklisting the source of such fraudulent clicks so that payment will not be made for such clicks in the future.

Pursuant to certain embodiments of the present invention, measured location data may also be used in identifying instances of click fraud. Such measured location data may be provided by a location capable device that is associated with the user 110 that activates the hyperlink 185 associated with the Internet advertisement 180 at issue. The measured location may be expressed, for example, in terms of latitude and longitude or any other method of specifying a measured location.

Figure 3:
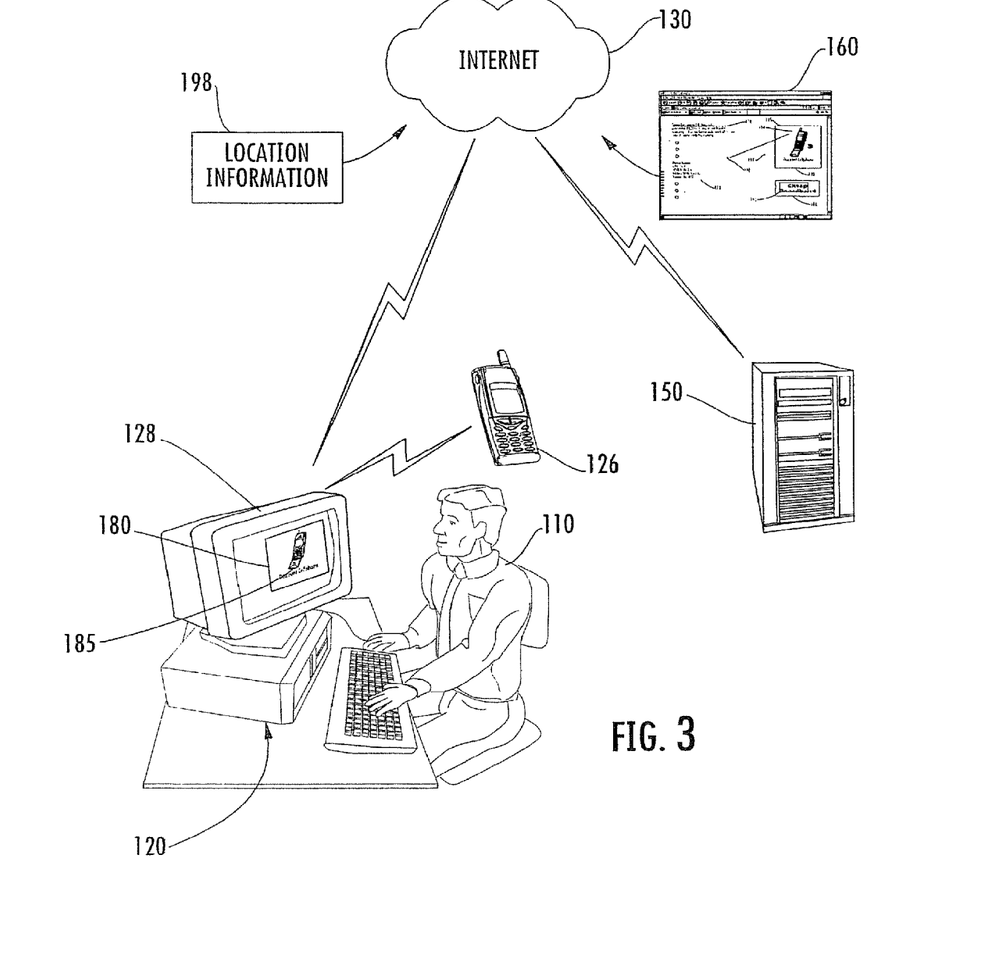
FIG. 3 is a schematic diagram illustrating how measured location information may be collected when a user activates an Internet advertisement

FIG. 3 is a schematic diagram illustrating how the measured location data may be obtained for use in identifying click fraud pursuant to certain embodiments of the present invention. As shown in FIG. 3, the user 110 may access the Internet 130 via a computer 120. In response to a request sent by the user 120, a server 150 sends a web page 160 to the computer 120 via the Internet 130, and the web page 160 is displayed on a monitor 128 of the computer 120. The displayed web page 160 includes an Internet advertisement 180 that includes a hyperlink 185. A location-capable device associated with the user 110 such as, for example, a cellular telephone 126 that includes a GPS receiver, may be in communication with the computer 120. As is well known to those of skill in the art, such GPS receivers use information provided by a system of GPS satellites to determine the location of the receiver. Measured location information 198 that is provided by the GPS receiver (or other location measuring/determining device) may be sent to the server 150 along with the request for the web page 160' that is sent in response to activation of the hyperlink 185. It will be appreciated that the GPS receiver may be part of the electronic device that is used to access the Internet (e.g., a cellular telephone that includes both a web browser and a GPS receiver), or may be a separate electronic device that communicates with the electronic device that is used to access the Internet via a wired or wireless (e.g., Bluetooth) connection.

In some embodiments of the present invention, the measured location data 198 may automatically be collected (if available) and provided each time the user 110 activates an Internet advertisement. It will be appreciated, however, that not all users 110 may have location-capable devices that provide the measured location data 198 and/or that some users 110 may not always want to provide their location. Thus, in some embodiments, the user 110 may selectively decide whether or not to provide such measured location data 198, either by activating/deactivating a feature that sends measured location data when the user 110 activates an Internet advertisement and/or by making an active decision as to whether or not to provide the measured location data 198 on a case-by-case basis. Sponsors of Internet advertisements 180 may provide enticements for inducing users 110 to provide measured location data 198. For example, in some embodiments, a user 110 may be unable to activate a hyperlink 185 if the measured location data 198 is not provided. In other embodiments, special discounts or offers may be provided to users 110 that provide the measured location data 198.

Figure 4:
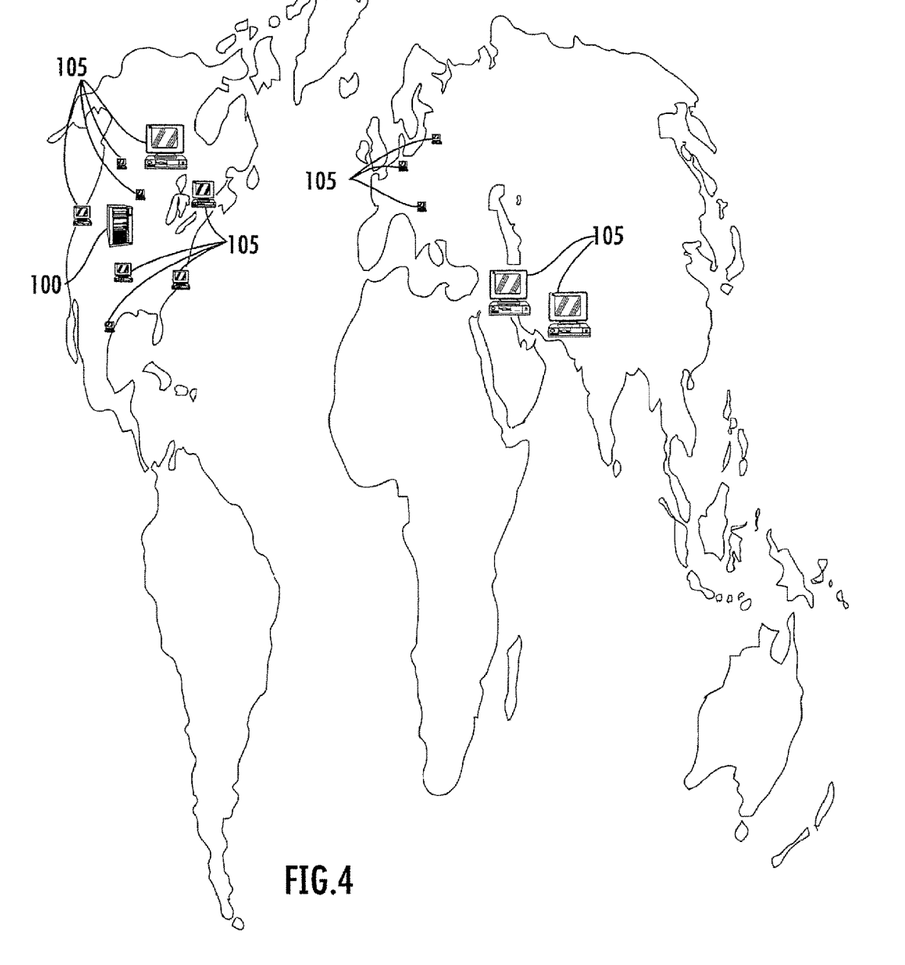
FIG. 4 is a schematic diagram illustrating an environment in which click fraud may occur.

FIG. 4 is a schematic diagram illustrating several common scenarios in which click fraud may occur. As shown in FIG. 4, a content provider may own/operate a server 100 that contains a web site that includes a web page 160 having a pay-per-click Internet advertisement 180. Users 110 around the world may access the web page 160, and some percentage of these users 110 may activate a hyperlink 185 within the Internet advertisement 180 in order to request a web page 160' associated with the hyperlink 185. In FIG. 4, computer icons 105 are intended to be indicative of the number of users in particular regions that activate the hyperlink 185, with the large icons 105 representing regions in which a large number of users activated the hyperlink 185, and the smaller icons 105 representing regions in which correspondingly smaller number of users activated the hyperlink 185.

In the scenario depicted in FIG. 4, most of the regions in which a threshold number of users have activated the hyperlink 185 are located in the United States as shown by the seven icons 105 located in the United States (as compared to a total of six icons throughout the rest of the world). Such a United States centric distribution of users activating a particular Internet advertisement 180 might be expected for an Internet advertisement 180 relating to, for example, goods offered for sale by a United States based sponsor of the advertisement.

However, as shown in FIG. 4, a large number of activations also may originate from unexpected locations, such as, for example, the large number of activations shown in FIG. 4 as originating in India and Montana. The large number of activations from India may suggest, for example, that a competitor or the content provider has hired one or more individuals to repeatedly click on the hyperlink associated with the Internet advertisement 180 (or that a computer program has been activated that automatically is repeatedly clicking on the hyperlink) in order to raise the sponsoring companies Internet advertisement costs. The large number of activations from Montana may suggest the same thing.

As discussed above, pursuant to certain embodiments of the present invention, measured location data 198 may be collected for at least some of the instances in which a particular Internet advertisement 180 is activated. This measured location data 198 may be used to assist in identifying the occurrence of potential click fraud such as the exemplary instances of click fraud discussed in conjunction with FIG. 4. For example, the measured location data may indicate that more than a threshold number of activations of the advertisement (e.g., 6) have occurred from one specific location within a certain time period (e.g., 1 day or 1 week). Such an occurrence may suggest that click fraud is occurring, and as even more clicks are received from the same location (e.g., 10, 100 or 1000 clicks within the given time period), the probability that click fraud is occurring increases. Likewise, an unexpectedly larger number of clicks originating from a small region (as determined by the measured location data) may also be indicative of click fraud. Pursuant to certain embodiments of the present invention, different thresholds may be set for a number of clicks (activations) originating from a particular location and/or region within a given time period that are sufficient to raise an alert that click fraud may be occurring. In some embodiments, the world (or portions thereof) may be subdivided into a plurality of regions, and common or individually set thresholds may be used for each region. In other embodiments, the regions may be dynamically established (e.g., the system may identify when a certain number of sources located within a specified distance of each other activated the same Internet advertisement 180 within a given time period).

The thresholds may be set in a variety of ways. For example, in some embodiments, demographic information (discussed below) may be used to set thresholds for various locations and/or regions. In other embodiments, the thresholds may be comparative in the sense that the number of activations from a particular location or region are compared to the number of activations from other locations or regions and the threshold is based on the difference of such comparisons. In still other embodiments, the threshold may be predefined values. In still further embodiments, the thresholds may be adaptive. For example, a particular threshold could automatically increase over time to reflect an expected gradual increase in the number of activations. The use of such an adaptive threshold may allow for natural growth in the number of activations as a function of time while still identifying very rapid increases in the number of activations that are more likely to reflect click fraud. In other situations, a threshold could adaptively decrease over time in order to maintain an effective threshold in circumstances (and/or regions) where a natural decrease in the number of activations may be expected. It will be appreciated that a wide variety of threshold setting mechanisms and algorithms may be used in the systems, methods and computer program products according to embodiments of the present invention.

Figure 5:
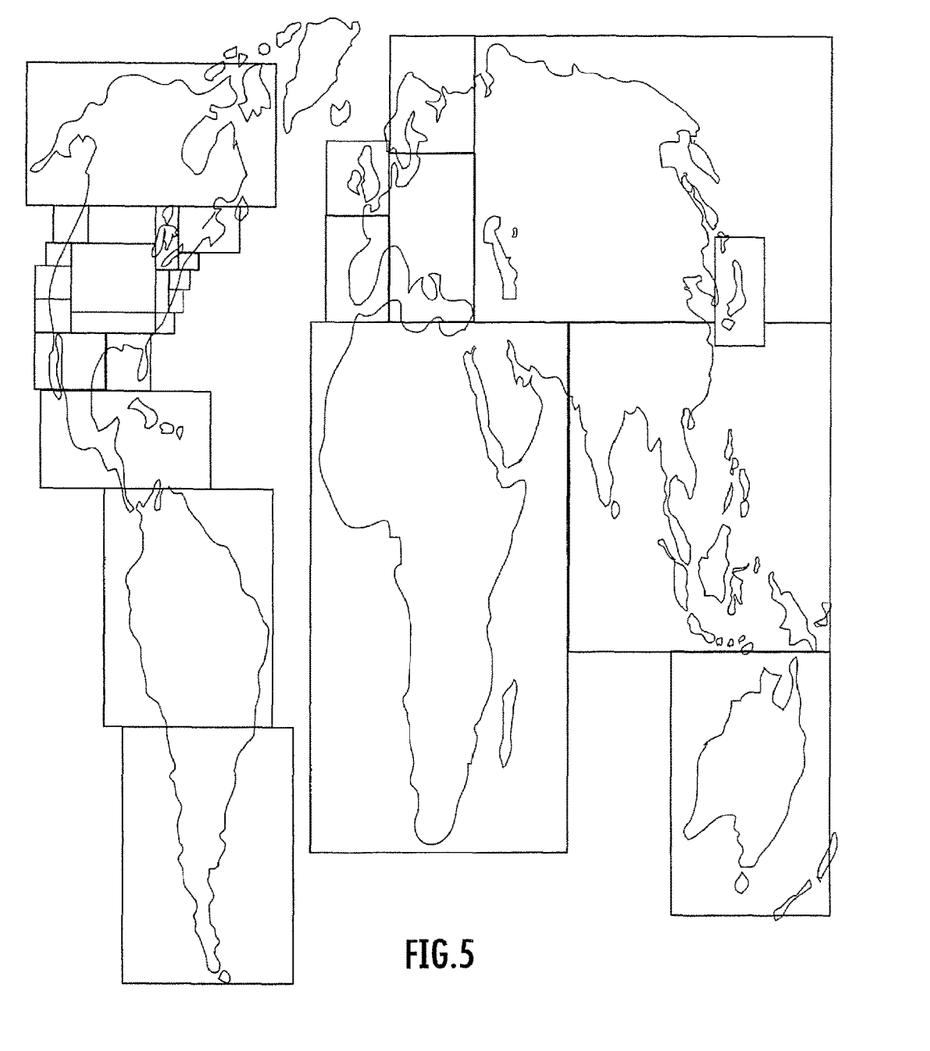
FIG. 5 is a schematic diagram illustrating how a geographic region may be subdivided so as to allow comparing click-through-rates for different sub-regions.

Pursuant to further embodiments of the present invention, demographic information relating to certain geographic regions may be used to provide enhanced click fraud detection. For example, as shown in FIG. 5, the world or portions thereof may be divided into a plurality of geographic regions, which are indicated by the boxes in FIG. 5. Demographic information is collected and stored for each region. This stored demographic information includes information that may be suggestive of the probability that legitimate activations of a particular Internet advertisement would be generated from the region at issue. This probability may comprise, for example, an absolute probability or a comparative probability with respect to the probability that legitimate activations of the Internet advertisement would be generated in other of the regions.

The demographic information may include, for example, population data for the region, average household income information, percentage of literate individuals, percentage of English speaking individuals, percentage of households with Internet access and/or a wide variety of other such general information. The demographic information may also include information that may be particularly relevant for specific advertisements such as, for example, the percentage of the population that smokes which may be a highly relevant with respect to cigarette advertisements. Each time an Internet advertisement is activated, the measured location of the source of the activation is reviewed to determine the region in which the source is located. Algorithms may be established that set expected "click-through-rates" for each region for each Internet advertisement monitored. Herein, the term "click-through-rate" refers to the percentage of times that an Internet advertisement was displayed that resulted in the user clicking on or otherwise activating the advertisement. Consequently, the click-through-rate may be calculated as the number of times the advertisement was activated divided by the number of times the advertisement was displayed to a user.

As noted above, the algorithms may set the expected "click-through-rates" for each region absolutely or compared to other regions. As a very simple example, one would not expect that an English language Internet advertisement for a service offered in the United States would result in a high number of activations that originated in Africa or Asia as compared to the number of activations of the Internet advertisement from source in the United States (or sub-portions thereof). Consequently, by comparing the click-through-rate on the advertisement for sources in Africa or Asia to the click-through-rate for one or more regions in the United States it may be possible to quickly and easily detect potential instances of click fraud originating from African or Asian sources. The algorithms may include thresholds which, if exceeded, indicate that click fraud is likely occurring. The algorithms may take into account the above listed demographic information and a wide variety of other factors in determining expected comparative click-through-rates per region (either comparative or absolute). When the algorithms indicate that the click-through-rate associated with a region exceeds a threshold, a variety of corrective actions may be taken. One such corrective action may be to more closely or thoroughly analyze collected information on each of the Internet activations originating from that region for further indications that some or all of the activations may be fraudulent. The system may also record information regarding specific activations that appear to be fraudulent, and supporting proof thereof, which may be used to support refusing to pay for such activations and/or demanding a refund from the content provider that hosted the Internet advertisement at issue. Specific sources, as identified by, for example, IP address, measured location or other means, may also be "blacklisted" so that requests for a web page originating from those sources are not honored (i.e., the web page is not delivered) or so that no pay-per-click charge is incurred for activations by the blacklisted source.

Figure 6:
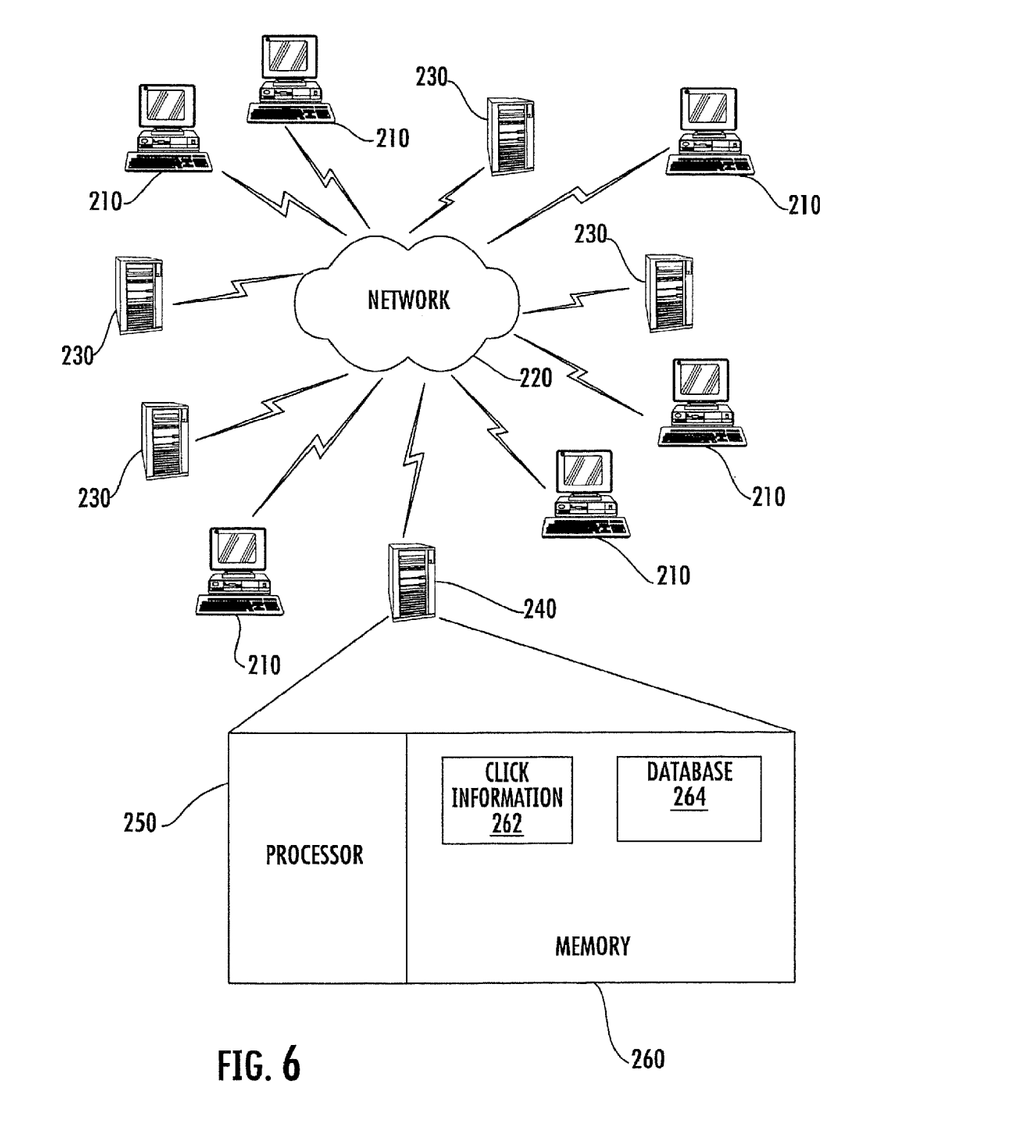
FIG. 6 is a block diagram of a system for detecting click fraud according to certain embodiments of the present invention.

Pursuant to further embodiments of the present invention, data processing systems are provided that may be used to identify and track click fraud using location information. FIG. 6 illustrates such a data processing system 240 according to certain embodiments of the present invention. As shown in FIG. 6, a plurality of user terminals 210 are connected to a network 220 such as the Internet. The user terminals 210 may comprise any terminal or other platform that is capable of receiving web pages including for example, desk top computers, laptop computers, cellular telephones, personal digital assistants, etc. A plurality of content providers 230 are also connected to the network 220. These content providers may provide web pages to the users 210 in response to requests for such web pages. The content providers may comprise, for example, servers owned or run by commercial entities such as businesses selling goods or services, servers owned or run by Internet portals or providers such as Earthlink, Google, Yahoo, etc. As is also shown in FIG. 6, one or more data processing systems 240 may also be connected to the network 220. The data processing system 240 may, for example, be co-located with one of the content providers or may be a stand-alone data processing system. In some embodiments, the data processing system 240 may be a server that is operated, for example, by an entity that is paying to have an Internet advertisement posted on another content provider's website or by a third party monitoring system. A software program may be resident on this server that carries out various methods of detecting click fraud according to embodiments of the present invention.

As shown in FIG. 6, the data processing system 240 may include a processor 250 and a memory 260. The processor 250 is configured to collect information 262 regarding each activation of one or more Internet advertisements. The information 262 that is collected and tracked by the processor 250 with respect to each activation may include, for example, the time the activation occurred, the date and/or day of the week when the activation occurred, an Internet address that is associated with the user (source) that activated the Internet advertisement, a keyword or phrase that was used to call up a search result web page on which the Internet advertisement was located, etc. In addition, the processor 250 may also detect and track a measured location associated with at least some of the users that activated the Internet advertisement. The processor may comprise a single processor or a plurality of processors, which may or may not be co-located.

The information stored in the memory 260 may include the information 262 that is tracked with respect to each activation of the Internet advertisement(s). In addition, the memory 260 may include a database 264 that includes demographic information for each of a plurality of geographic regions. It will be appreciated that the memory 260 may be a single memory or may alternatively comprise a plurality of memories, which may or may not be located in a single location. Likewise, the database 264 may comprise a single database or multiple databases, which may or may not be co-located.

The data processing system 240 may also include logic and/or software that is configured to detect computerized click fraud. For example, the data processing system 240 may include software that pulls and scans a web page to determine if Javascript or other similar code/commands exists within the web page content. Javascript may be used to produce a click-loop process that repeatedly triggers a hyperlink in order to create the illusion of many clicks on the hyperlink by users. If such Javascript is detected, the data processing system 240 may further determine if the Javascript is associated with the Internet advertisement at issue. If so, the data processing system 240 may generate a report positively identifying the page as a potential source of click fraud. The data processing system 240 may further track for patterns that are indicative of computerized click fraud such as, for example, repeated activations by the same source (or from the same location) with a very small interval between clicks and/or that are that spaced by a uniform interval. Other patterns may give further details, such as large jumps in traffic from individual sites.

Pursuant to further embodiments of the present invention, the amount that is paid by the sponsor of an Internet advertisement may vary based on whether or not the activation of the advertisement includes measured location data of the source of the activation. In particular, the sponsor of the Internet advertisement may pay at a lesser rate (including, in some embodiments, a rate of zero) for sources of "clicks" on the Internet advertisement that do not provide measured location data. In order to entice users to provide such data, in some embodiments of the present invention, special discounts or promotions may be made available to users that provide measured location data in an effort to entice users to provide this information. In still other embodiments, users that do not provide measured location data may be prevented from activating the hyperlink in order to reduce the risk of click fraud. In such embodiments, the user could be provided an IP address or some other mechanism that would allow legitimate users who do not have the capability to provide measured location data to access the web site associated with the hyperlink without triggering a referral requiring a pay-per-click payment.

Figure 7:
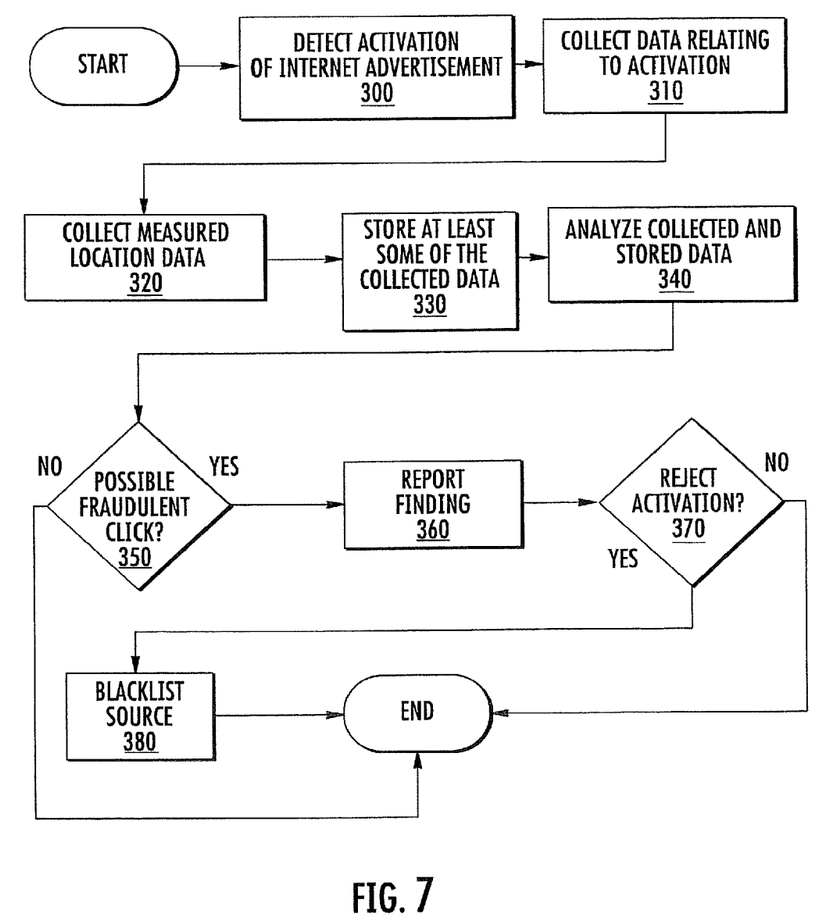
FIG. 7 is a flow chart illustrating methods of identifying fraudulent activation of Internet advertisements according to certain embodiments of the present invention.

FIG. 7 is a flow chart diagram illustrating methods of identifying fraudulent activations of Internet advertisements according to further embodiments of the present invention. As shown in FIG. 7, operations may begin at block 300 with the detection of the activation of an Internet advertisement (e.g., a user clicking on a hyperlink embedded in an Internet advertisement posted on a web page delivered to the user by a content provider). Information relating to the activation such as, for example, the time of the activation, date of the activation, IP address of the source of the activation, etc. is collected (block 310). In addition, measured location data of the source of the activation such as, for example, the latitude and longitude of the source is also collected (block 320). At least some of the data collected at blocks 310 and 320 may be stored (block 330). In addition, the collected data may be analyzed and/or compared to other stored data in an effort to identify if the activation of the Internet advertisement is likely a fraudulent activation (block 340). The stored information that may be used in the operations of block 340 may include, for example, previously stored information regarding other activations of the Internet advertisement (or summaries thereof) and/or demographic information for a geographic region in which the source of the activation is located (and perhaps demographic information for other geographic regions as well). As shown at block 350 of FIG. 7, if the analysis does not indicate that the activation was likely a fraudulent activation, operations may end. However, if it appears likely that the activation was fraudulent, then this finding may be reported (block 360). In addition, in some embodiments, a determination may be made as to whether or not to reject the activation (i.e., to not serve the web page associated with the hyperlink in response to the activation) (block 370). Rejection of the activation may also lead to a blacklisting of the source (block 380) such that subsequent requests from the location of the source may be ignored.

Figure 8:
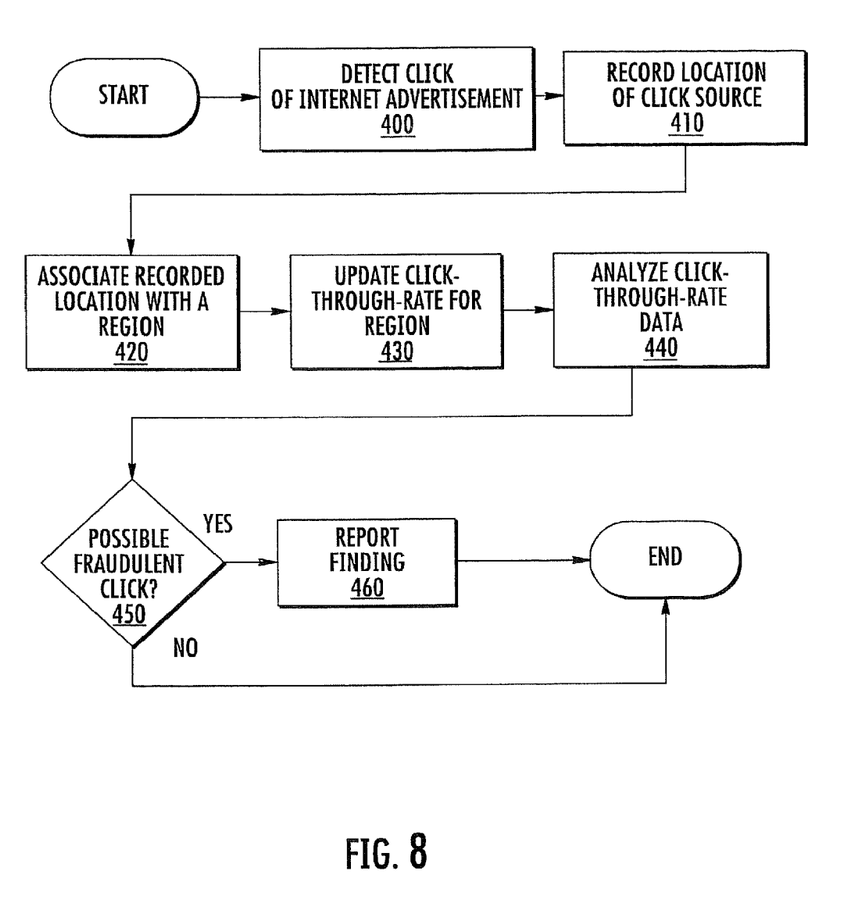
FIG. 8 is a flow chart illustrating methods of identifying click fraud according to certain embodiments of the present invention.

FIG. 8 is a flow chart diagram illustrating methods of detecting click fraud according to further embodiments of the present invention. As shown in FIG. 8, operations may begin at block 400 with the detection of a click on an Internet advertisement. In response to detecting the click, measured location data as to the source of the click is recorded (block 410). The recorded location may then be associated with one of a plurality of geographic regions (block 420). Then, the click-through-rate for the one of the plurality of regions may be updated to reflect the most recent click (block 430). Then, the click-through-rate data for one or more of the plurality of regions may be analyzed to make a determination if the click is likely a fraudulent click (blocks 440 and 450). Operations then conclude after any potentially fraudulent click has been reported or otherwise recorded (block 460).

As will be appreciated by one of skill in the art, the present invention may be embodied as a method and/or as a system. Moreover, aspects of embodiments of the present invention may take the form of a computer program product on a computer-usable storage medium having computer-usable program code embodied in the medium. Any suitable computer readable medium may be utilized including, for example, hard disks, volatile memory, non-volatile memory, CD-ROMs, optical storage devices or magnetic storage devices.

Computer program code for carrying out operations of the present invention may be implemented using programmable aspects of existing application programs. Aspects of the computer program code may also be written in an object oriented programming language such as Java®, Smalltalk or C++ and/or using a conventional procedural programming languages, such as the "C" programming language. The program code may execute entirely on a single computer or on multiple computers, which may or may not be co-located.

The present invention is described above with reference to flowchart illustrations and block diagrams of methods and systems according to embodiments of the invention. It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In the drawings and specification, there have been disclosed exemplary embodiments of the invention. Although specific terms are employed, they are used in a generic and descriptive sense only and not for purposes of limitation, the scope of the invention being defined by the following claims.

The invention claimed is:

1. A method, comprising:
receiving, by a server, requests for a webpage sent via the Internet from client devices, the requests for the webpage responsive to activations of a hyperlink associated with an Internet advertisement by the client devices;
receiving, by the server, global positioning system information sent via the Internet, the global positioning system information describing a geographic location reported by each one of the client devices activating the hyperlink;
determining, by the server based on the global positioning system information, that at least a portion of the client devices report a common geographical location;
determining, by the server, a sum of the requests for the webpage sent via the Internet from at least the portion of the client devices reporting the common geographical location;
serving, by the server, the Internet advertisement in response to the sum of the requests for the webpage being less than a threshold value associated with a click fraud; and
rejecting, by the server, the serving of the Internet advertisement in response to the sum of the requests for the webpage being equal to or exceeding the threshold value associated with the click fraud, such that the Internet advertisement is not served via the Internet to the client devices activating the hyperlink.

2. The method of claim 1, further comprising receiving the global positioning system information with each one of the requests for the webpage.

3. The method of claim 1, further comprising billing for any of the activations.

4. The method of claim 1, further comprising regionalizing the global positioning system information into different regions.

5. The method of claim 1, further comprising determining a time associated with each one of the activations.

6. The method of claim 1, further comprising determining a region associated with the common geographical location.

7. The method of claim 6, further comprising determining a demographic associated with the region.

8. A system, comprising:
a hardware processor; and
a memory device, the memory device storing code, the code when executed causing the hardware processor to perform operations, the operations comprising:

receiving requests for a webpage sent via the Internet from client devices, the requests for the webpage responsive to activations of a hyperlink associated with an Internet advertisement;

receiving global positioning system information sent via the Internet, the global positioning system information reported by the client devices activating the hyperlink associated with the Internet advertisement;

determining the client devices report a common geographical location based on the global positioning system information reported by the client devices;

determining a sum of the activations of the hyperlink associated with the common geographical location based on the global positioning system information reported by the client devices;

serving the Internet advertisement responsive to the activations of the hyperlink in response to the sum of the requests for the webpage being less than a threshold value associated with a click fraud; and rejecting the serving of the Internet advertisement in response to the sum of the requests for the webpage being equal to or exceeding the threshold value associated with the click fraud, such that the Internet advertisement is not served via the Internet to the client devices activating the hyperlink.

9. The system of claim 8, wherein the operations further comprise receiving an Internet protocol address associated with each one of the client devices.

10. The system of claim 8, wherein the operations further comprise billing for one of the activations.

11. The system of claim 8, wherein the operations further comprise regionalizing the global positioning system information into different regions.

12. The system of claim 8, wherein the operations further comprise determining a time associated with each one of the activations.

13. The system of claim 8, wherein the operations further comprise determining a region associated with the common geographical location.

14. The system of claim 13, wherein the operations further comprise determining a demographic associated with the region.

15. A memory device storing code that when executed causes a hardware processor to perform operations, the operations comprising:

hosting a webpage representing an Internet advertisement;

receiving requests for the webpage sent via the Internet from client devices, the requests for the webpage responsive to activations of a hyperlink associated with the Internet advertisement;

receiving global positioning system information sent via the Internet, the global positioning system information describing a geographic location associated with each one of the client devices activating the hyperlink;

determining the client devices have a common geographical location based on the global positioning system information;

determining a sum of the activations of the hyperlink associated with the common geographical location based on the global positioning system information;

when the sum of the requests for the webpage is less than a threshold value associated with a click fraud, then serving the Internet advertisement responsive to the activations of the hyperlink; and when the sum of the requests for the webpage is equal to or greater the threshold value associated with the click fraud, then rejecting the serving of the Internet advertisement such that the Internet advertisement is not served via the Internet to the client devices activating the hyperlink.

16. The memory device of claim 15, wherein the operations further comprise receiving an Internet protocol address associated with each one of the client devices.

17. The memory device of claim 15, wherein the operations further comprise billing for any of the activations.

18. The memory device of claim 15, wherein the operations further comprise regionalizing the global positioning system information into different regions.

19. The memory device of claim 15, wherein the operations further comprise determining a time associated with each one of the activations.

20. The memory device of claim 15, wherein the operations further comprise determining a region associated with the common geographical location.

* * * * *